United States Patent
White

(10) Patent No.: US 9,622,597 B2
(45) Date of Patent: Apr. 18, 2017

(54) GARMENT RACK

(71) Applicant: Charity Lovette White, Moreno Valley, CA (US)

(72) Inventor: Charity Lovette White, Moreno Valley, CA (US)

( * ) Notice: Subject to any disclaimer, the term of this patent is extended or adjusted under 35 U.S.C. 154(b) by 0 days.

(21) Appl. No.: 14/336,140

(22) Filed: Jul. 21, 2014

(65) Prior Publication Data
US 2016/0015190 A1   Jan. 21, 2016

(51) Int. Cl.
| A47F 5/08 | (2006.01) |
| A47F 7/24 | (2006.01) |
| A47F 5/00 | (2006.01) |
| B62B 11/00 | (2006.01) |
| B62B 3/00 | (2006.01) |
| A47F 5/10 | (2006.01) |

(52) U.S. Cl.
CPC .............. *A47F 7/24* (2013.01); *A47F 5/0006* (2013.01); *A47F 5/108* (2013.01); *B62B 3/002* (2013.01); *B62B 11/00* (2013.01)

(58) Field of Classification Search
CPC .. A45C 5/14; A45C 5/04; A45C 13/03; A45C 13/262; A45C 9/00; A47B 43/04; A47B 61/00; A47B 61/06
See application file for complete search history.

(56) References Cited

U.S. PATENT DOCUMENTS

| 1,429,456 | A | * | 9/1922 | Richmond | ............. | A47B 61/06 182/151 |
| 1,830,282 | A | * | 11/1931 | Lorch | ................... | A47B 61/003 160/351 |
| 1,912,425 | A | * | 6/1933 | Baumer | ................ | E04H 1/1244 135/145 |
| 2,016,688 | A | * | 10/1935 | Stelljes | ................... | A45C 13/03 206/298 |
| 2,340,540 | A | * | 2/1944 | Lange | ................... | A47B 61/003 190/11 |
| 2,473,047 | A | * | 6/1949 | Bershad | ................... | D06F 57/12 126/9 R |
| 2,476,932 | A | * | 7/1949 | Tucker | ................... | A45C 13/03 190/15 R |
| 3,144,946 | A | * | 8/1964 | Ellis | ......................... | A47F 7/24 211/182 |
| 3,298,477 | A | * | 1/1967 | Martinez | .............. | A47G 9/1009 190/1 |

(Continued)

*Primary Examiner* — Daniel J Troy
*Assistant Examiner* — Kimberley S Wright
(74) *Attorney, Agent, or Firm* — Orrick, Herrington & Sutcliffe LLP

(57) ABSTRACT

Garment rack and garment transport system. A collapsible and mobile garment rack is disclosed that can be easily and efficiently erected and collapsed by a single user. The erected garment rack can be used to hang garments across a hanger pole and display shoes on an elevated shoe rack. The garment rack is self containing and collapses easily and efficiently into a tray and cover board. The garment rack is easily maneuvered while erected or collapsed on a set of casters located at the bottom of the garment rack. Additionally, the garment rack can be used as part of a clothing transport system which comprises a clothing transport bag that attaches to the top of the cover board while the garment rack is collapsed. This way, the garments and garment rack can be transported as one unit.

14 Claims, 3 Drawing Sheets

(56) References Cited

U.S. PATENT DOCUMENTS

| | | | | |
|---|---|---|---|---|
| 3,499,541 | A * | 3/1970 | Mackie | A47B 45/00 211/134 |
| 3,522,955 | A * | 8/1970 | Warner, Jr. | A45C 5/14 16/113.1 |
| 3,552,529 | A * | 1/1971 | Marshall | A47B 61/06 190/107 |
| 3,918,591 | A * | 11/1975 | Cooper | A47F 7/19 211/204 |
| 4,054,209 | A * | 10/1977 | Solomon | A47F 7/24 211/208 |
| 4,219,175 | A * | 8/1980 | Harig | A47B 57/42 248/125.3 |
| 4,267,905 | A * | 5/1981 | Stewart | A45C 13/02 190/13 R |
| 4,273,222 | A * | 6/1981 | Cassimally | A45C 5/146 190/18 A |
| 4,982,820 | A * | 1/1991 | Scott | A45C 9/00 190/13 R |
| 5,117,951 | A * | 6/1992 | Sisson | A45C 13/03 190/13 C |
| 5,323,887 | A * | 6/1994 | Scicluna | A45C 5/14 16/18 CG |
| 5,385,220 | A * | 1/1995 | Pond | A45C 13/262 190/115 |
| 5,575,362 | A * | 11/1996 | Franklin | A45C 3/004 16/113.1 |
| 5,581,847 | A * | 12/1996 | Hsieh | A45C 13/262 16/113.1 |
| 5,615,757 | A * | 4/1997 | Chen | A45C 13/262 16/113.1 |
| 5,617,962 | A * | 4/1997 | Chen | A47G 25/0664 211/204 |
| 5,762,168 | A * | 6/1998 | Miyoshi | A45C 13/262 190/115 |
| 5,769,194 | A * | 6/1998 | Chang | A45C 5/14 16/113.1 |
| 5,934,425 | A * | 8/1999 | Sadow | A45C 13/262 16/408 |
| 5,943,936 | A * | 8/1999 | Deliman | A45C 13/262 16/113.1 |
| 6,041,900 | A * | 3/2000 | Sadow | A45C 5/14 190/115 |
| 6,065,574 | A * | 5/2000 | Miyoshi | A45C 13/262 190/115 |
| 6,264,047 | B1 * | 7/2001 | Crumley | A47G 25/0685 190/102 |
| 6,302,250 | B1 * | 10/2001 | Sadow | A45C 5/14 190/115 |
| 6,425,599 | B1 * | 7/2002 | Tsai | B62B 1/125 280/40 |
| 6,761,366 | B1 * | 7/2004 | Klemmensen | B25H 3/023 16/113.1 |
| 6,851,564 | B2 * | 2/2005 | Ng | A47B 43/00 108/171 |
| 7,607,535 | B2 * | 10/2009 | Jackson | A45C 9/00 190/112 |
| 7,854,444 | B2 * | 12/2010 | Zhuang | B62B 3/02 280/651 |
| 7,886,918 | B1 * | 2/2011 | Sauer | A47G 25/0685 211/99 |
| 8,118,145 | B1 * | 2/2012 | Hamamy | A45C 5/14 190/18 A |
| 8,534,434 | B2 * | 9/2013 | Crull | A45C 13/26 16/113.1 |
| 8,936,166 | B2 * | 1/2015 | Hornsby | A47G 25/0685 211/182 |
| 9,364,104 | B1 * | 6/2016 | Wood | A47F 5/0006 |
| 2002/0043544 | A1 * | 4/2002 | Caneba | A45C 13/262 224/584 |
| 2003/0038007 | A1 * | 2/2003 | Han | A45C 13/262 190/115 |
| 2003/0042093 | A1 * | 3/2003 | Godshaw | A45C 5/02 190/115 |
| 2004/0178035 | A1 * | 9/2004 | Wu | A45C 13/262 190/115 |
| 2006/0022419 | A1 * | 2/2006 | Phillips | B62B 3/02 280/47.35 |
| 2006/0213735 | A1 * | 9/2006 | Weinstein | A45C 5/14 190/18 A |
| 2007/0089952 | A1 * | 4/2007 | Herbst | A45C 5/14 190/8 |
| 2007/0256994 | A1 * | 11/2007 | Jackson | A45C 9/00 211/85.3 |
| 2008/0073880 | A1 * | 3/2008 | Bess | B62B 3/02 280/651 |
| 2008/0230339 | A1 * | 9/2008 | Pereira | A45C 5/03 190/18 A |
| 2009/0000894 | A1 * | 1/2009 | Middup | A45C 5/14 190/15 R |
| 2009/0321204 | A1 * | 12/2009 | Barkow | A45C 13/02 190/8 |
| 2010/0117499 | A1 * | 5/2010 | Fortier | A45C 7/0031 312/306 |
| 2011/0036793 | A1 * | 2/2011 | Sauer | A47G 25/0685 211/85.3 |
| 2012/0074082 | A1 * | 3/2012 | Hornsby | A47G 25/0685 211/85.3 |
| 2012/0125728 | A1 * | 5/2012 | Tamarkin | A45C 5/04 190/13 R |
| 2014/0027225 | A1 * | 1/2014 | Richards | A45C 7/0031 190/13 R |
| 2014/0062277 | A1 * | 3/2014 | Kagramanyan | A47B 61/00 312/280 |
| 2014/0262659 | A1 * | 9/2014 | Hirsch | A47B 61/06 190/13 R |
| 2015/0008201 | A1 * | 1/2015 | Qiang | A47F 7/24 211/85.3 |
| 2015/0041420 | A1 * | 2/2015 | Zelek | A47B 43/00 211/149 |
| 2015/0053520 | A1 * | 2/2015 | Findlay | A45C 9/00 190/13 R |

* cited by examiner

GARMENT RACK

TECHNICAL FIELD

The field of the invention relates to garment racks, and, more specifically, to a garment rack that is highly mobile and can be quickly and efficiently erected and collapsed.

BACKGROUND

Garment racks have been used to display garments and for easily transporting the displayed garments while they are on the rack. One such garment rack is disclosed in U.S. Pat. No. 3,921,814 which is constructed from a plurality of extruded poles and consists of two parallel vertical poles supporting a horizontal pole between them. The three poles are supported by a base with four wheels for moving the garment rack around.

Although garment racks of the type discussed above are useful for moving garments around in a single location, the racks themselves are not easily transportable and require a large truck to transport. Disassembly of these racks also requires numerous steps and results in many disconnected parts that can be easily lost during transportation.

Accordingly, it is a general objective of the present invention to provide an improved portable garment rack that can be easily erected and collapsed for supporting garments and other articles.

It is a further objective of the invention to provide a garment rack that is easily erected and collapsed while providing storage for parts in its collapsed configuration.

SUMMARY

Small independent retailers often set up mobile shops in flea markets or other temporary sites. For these retailers, transportation of merchandise and display equipment can be quite difficult. The present invention alleviates many of these difficulties by providing (1) an easily erectable and collapsible garment rack, and (2) providing a garment transport system that can be used with the rack to transport merchandise, e.g., clothing and shoes. Although clothing and shoes will be discussed for use with the rack, it should be understood that the rack can be used with transport any type of merchandise.

The garment rack comes in two configurations (1) a collapsed configuration and (2) an erected configuration. In the collapsed configuration, all of the parts of the garment rack are housed in a rectangular box comprising a tray and cover board which can be easily transported and quickly stored in the retailer's vehicle. In the erected configuration the cover board is removed and set aside and two vertical arms are erected and secured using channel locks. The two parallel vertical arms support a cylindrical hanger pole for hanging garments and other merchandise. In the erected configuration the height of the hanger pole can be adjusted using extension arms and a nut and knob assembly found in each of the vertical arms. The garment rack also has a shoe rack which is supported by swing levers attached to the bottom section of the vertical arms. Additionally, unlike garment racks of the prior art which are made of extruded poles, the garment rack of the present invention has numerous flat planar surfaces that can be used for advertisements or decorative space to attract the attention of potential customers.

Additionally, the garment rack can be used in combination with a garment transport system. The garment transport system is intended for use in temporary retail settings such as flea markets which require the retailer to transport, set up, and unpack their merchandise. The retailer can transport both merchandise and garment rack in one complete system. The garment transport system comprises the disclosed garment rack and a garment transport bag that is designed to be securely attached to the cover board of the garment rack. The garment transport bag could be a duffle, luggage, or any other type of garment bag that is known in the art and specially adapted to be securely attached to the top of the cover board.

The above and other preferred features, including various novel details of implementation and combination of elements, will now be more particularly described with reference to the accompanying drawings and pointed out in the claims. It will be understood that the particular methods, apparatuses, and systems described herein are shown by way of illustration only and not as limitations. As will be understood by those skilled in the art, the principles and features described herein may be employed in various and numerous embodiments without departing from the scope of the teachings herein.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Figure 1:
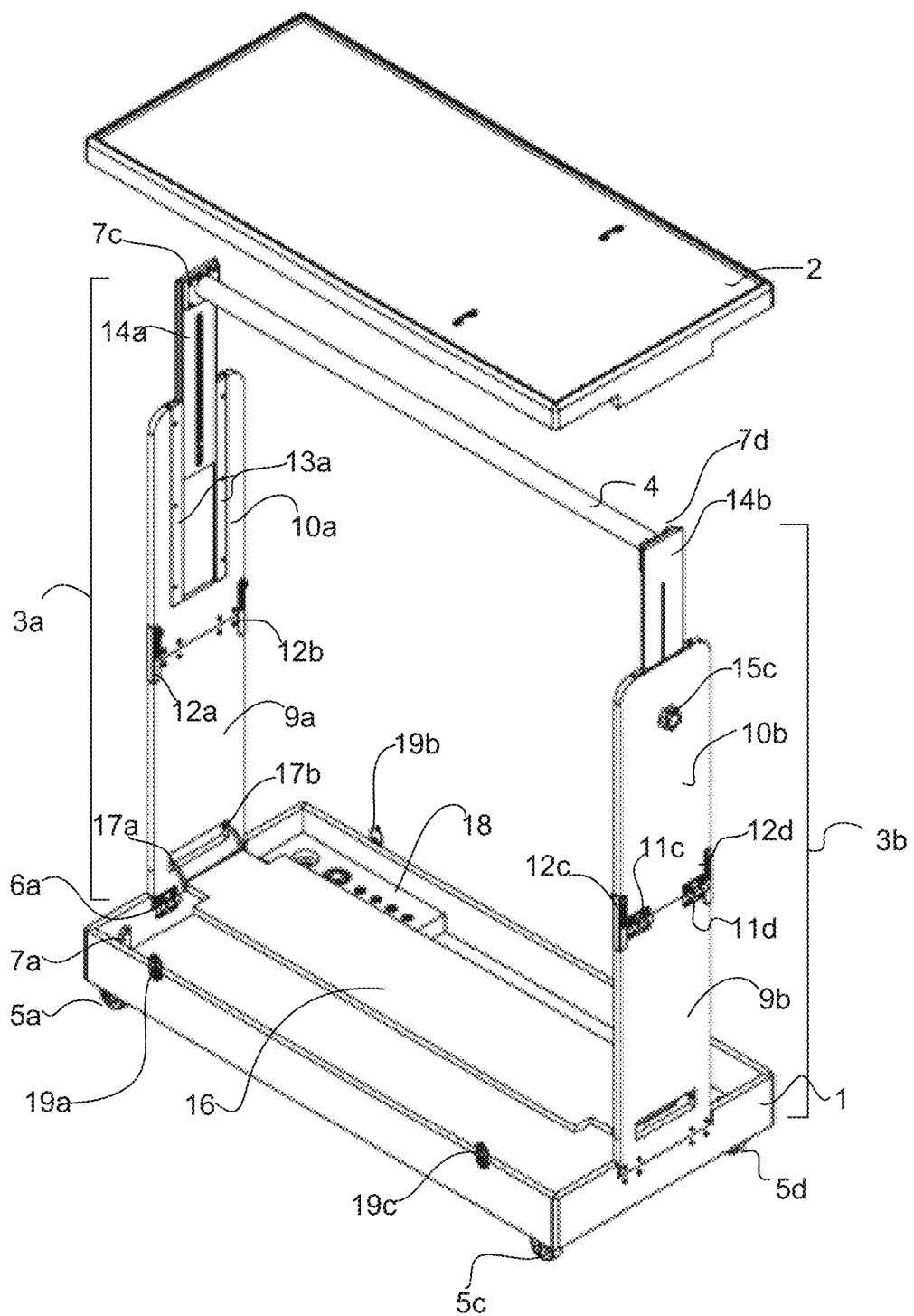
FIG. 1 illustrates the garment rack in its erected configuration.

FIG. 1 depicts the garment rack in its erected configuration. The garment rack comprises a tray 1, a cover 2, a pair of arms 3a-b, a hanger pole 4, and a set of casters 5a-d.

Figure 2:
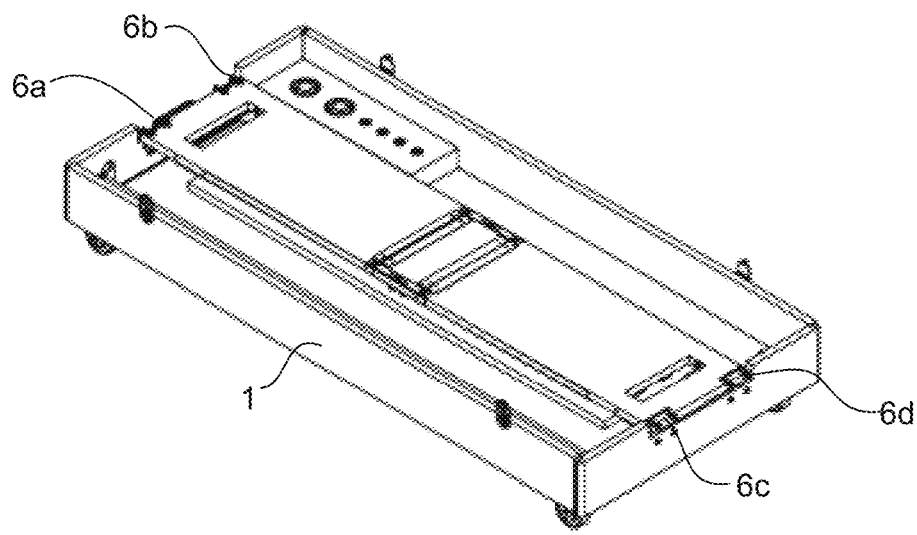
FIG. 2 illustrates the garment rack in its collapsed configuration without the cover.
Figure 3:
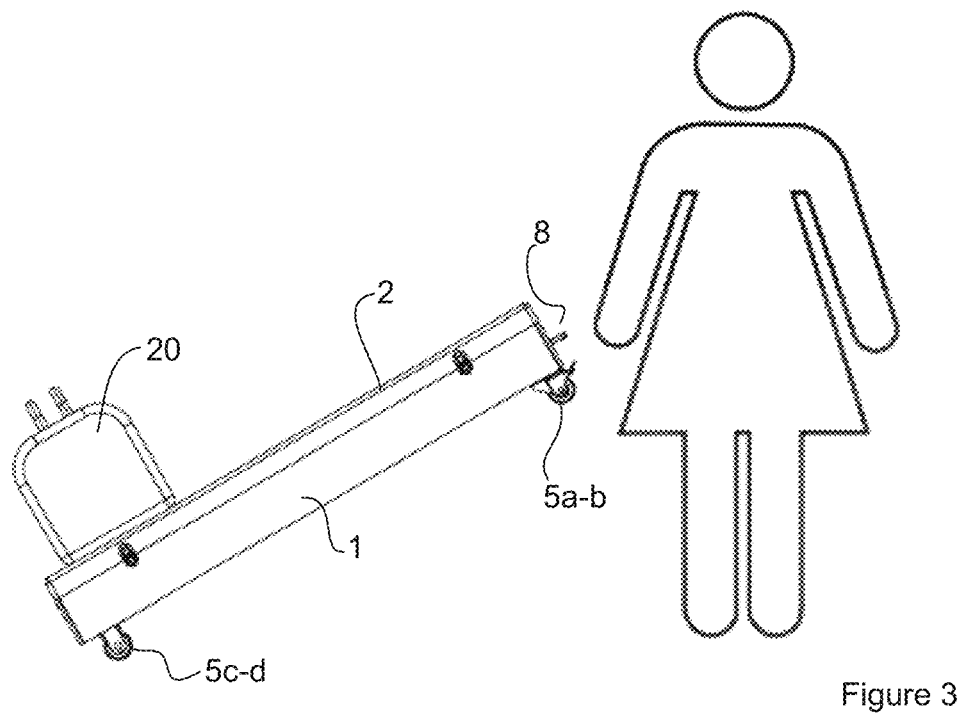
FIG. 3 illustrates the garment rack and garment transport system being pulled by a user.
Figure 4:
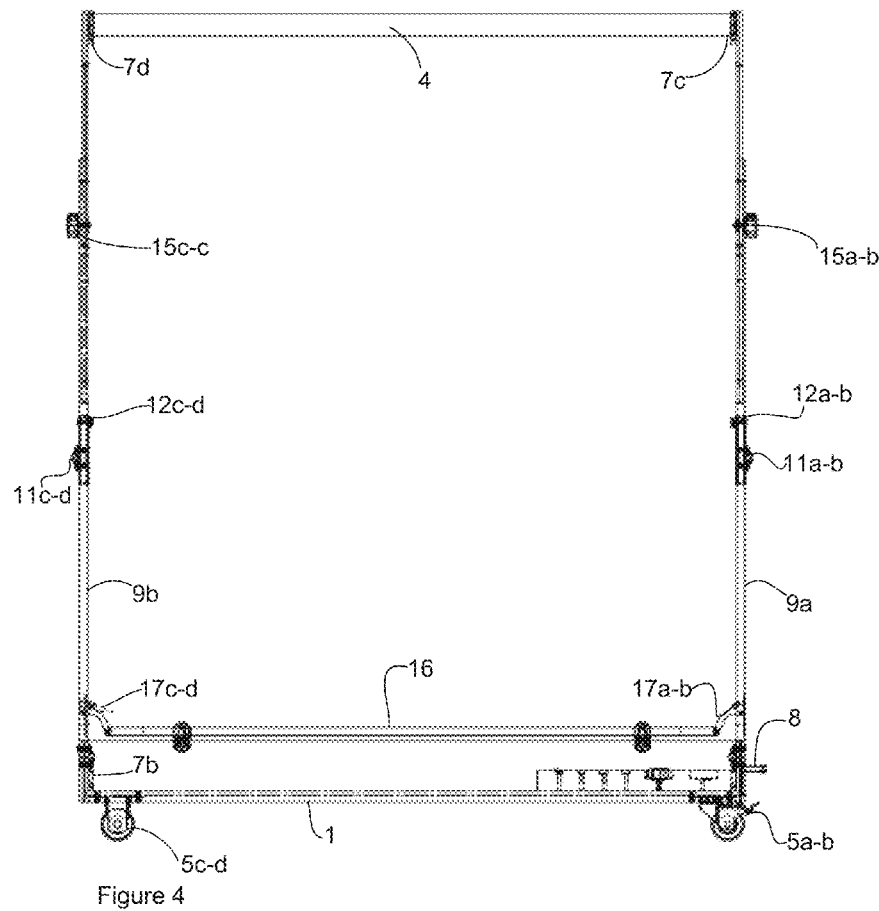
FIGS. 4 and 5 illustrate alternative views of the garment rack in its erected configuration.
Figure 5:
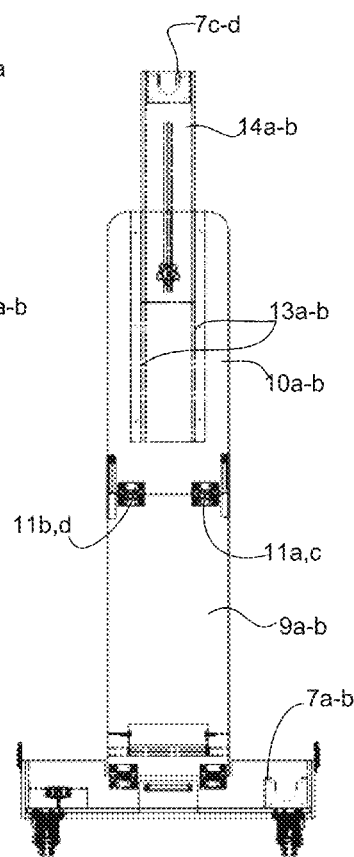

The Tray 1:

In the preferred embodiment, the tray 1 is rectangular having two short parallel sides and two long parallel sides. The arms 3a and 3b are attached to the tray 1 along the short parallel sides with a set of hinges 6a-d positioned such that the arms collapse towards the center of the tray 1. Also attached to the inside face of the short parallel sides of tray 1 is a set of hanger saddles 7a-b which are used to store the hanger pole 4 when the garment rack is in its collapsed configuration. In the collapsed configuration, shown in FIG. 2, the hanger pole 4 is stored on one side of the tray 1 adjacent to one of the long parallel sides of the tray. In some embodiments, the empty spaces of tray 1 that are not used for storing the hanger pole or collapsed arms 3a-b can be partitioned into boxes or storage containers for storing additional merchandise or detachable parts of the garment rack. A handle 8 is attached to the exterior surface of tray 1 so that the user can pull the garment rack while it is collapsed as shown in FIG. 3.

The Arms 3a-b:

Arms 3a-b of the present invention are designed so they can be easily collapsed and stored within the tray 1 and erected to securely support hanger pole 4. In one embodiment, each arm comprises a base board 9a-b. The bottom portion of the base board 9a is hingedly attached to the top surface of a side of tray 1 and the bottom portion of base board 9b is hingedly attached to the opposite top surface of tray 1. In the present embodiment, the attachment is accomplished by using a set of hinges 6a-d, however, other fasteners that allow the arm to fold into the tray could be used such as a pivot joint. The top portion of base board 9a is hingedly attached to the bottom portion of the top board 10a. In the present embodiment, the attachment is accomplished using a set of hinges 11a-b, however, other fasteners that allow the arm to fold into itself could be used such as a pivot joint. Similarly, the top portion of base board 9b is hingedly attached to the bottom portion of top board 10b; also using a set of hinges 11c-d. At the bottom of each top board 10a-b are a set of channel locks 12a-d which are used to rigidly secure the top board to the base board when the garment rack is in its erected configuration. Although channel locks are disclosed, it should be understood that other locks known in the art can be used to secure the top board and base board such as cam locks, slide locks, clamp locks, etc. The top board 10a-b also comprises an extension track 13a-b for receiving an extension board 14a-b. The extension track 13a-b and extension board 14a-b allow the height of the garment rack to be adjusted using knob and nut assembly 15a-d. When the garment rack is in its collapsed configuration, the knob and nut assembly 15a-d can be stored in a side compartment 18 located in the tray 1. At the top of the extension track 13a-b is a hanger saddle 7c-d which is used to secure and support the hanger pole 4.

In an alternative embodiment, the bottom board 9a-b and top board 10a-b are not hingedly attached, but instead are slidably attached such that the top board 10a-b slides into a track found in the bottom board 9a-b (not depicted), similar to the way the extension board 14a-b is attached to the top board 10a-b in the depicted embodiment. This arrangement would also allow for the garment rack to be easily erected and collapsed.

The Shoe Rack 16:

A shoe rack 16 is attached between the arms 3a-b at the lower portion of the base board 9a-b with a set of swing levers 17a-d. The shoe rack 16 is used for displaying shoes in an elevated platform when the garment rack is in its erected configuration.

Casters 5a-d:

Casters are attached to the bottom of the tray 1. In the preferred embodiment, swivel casters 5a-b are attached to the base of the tray 1 at the same end that the handle 8 is attached while stationary casters 5c-d are attached to the opposite end. This allows the garment rack to be pushed around and easily maneuvered in its erected configuration and collapsed configuration. FIG. 3 shows the garment rack being pulled by a user by the handle in an elevated angle such that only the stationary casters 5c-d are being engaged. The swivel casters 5a-b also have locking latches that can be engaged to lock the casters in place.

The garment rack is designed to enable two configurations (1) a collapsed configuration and (2) an erected configuration. In the collapsed configuration, the entire garment rack is enclosed within the tray 1 and cover 2. To transition the garment rack to the erected configuration from the collapsed configuration, the user must remove the cover 2 by unlocking the latches 19a-d found along the side of tray 1. The base board 9a-b of arms 3a-b are then folded outwards to stand vertically from the collapsed horizontal configuration. When the two base boards 9a-b are folded outwards, the shoe rack 16 automatically lifts into position by virtue of swing levers 17a-d attached to the base boards 9a-b and the shoe rack 16. The top board 10a-b of arms 3a-b are then folded such that they form a long vertical upright board with the base board 9a-b. Channel locks 12a-d can then be slid downwards to lock the bottom board 9a-b and top board 10a-b into a long vertical upright board. The hanger pole is removed from the hanger saddles 7a-b located in the tray 1 and placed on the hanger saddles 7c-d located on the extension boards 14a-b. The nut and knob assemblies 15a-d are removed from their compartment 18 in tray 1 and attached to extension boards 14a-b. The height of the extension boards 14a-b can be adjusted and secured using the nut and knob assemblies 15a-d. Once the garment rack is secured in the erected configuration, garments can be hung along the hanger pole 4 and shoes can be placed on the shoe rack 16 for display. When the garment rack is used in retail settings, it can also be decorated along the arms 3 and sides of the tray 1 to attract customers. Decorations may include banners and sales advertisements, bold color schemes, jewels, molding, and other adornments to signal a retail setting.

Garment Transport System:

The garment rack can also be used with a garment transport system which comprises a garment transport bag 20 for storing garments that is adapted to be securely attached to the top of the cover 2. The garment transport bag 20 is used to store garments and other merchandise for transport with the garment rack. The garment transport bag 20 may be a duffle bag, luggage, suit case, or any other type of garment bag that is known in the art. The garment transport bag 20 may be adapted to be attached to the top of the garment rack cover 2 using either hook and loop fasteners, clamps, locks, snaps, etc. Using the garment transport system, a single retailer can set up a mobile storefront at any location. The garment transport system transports the garment rack, garments, and other merchandise as a single unit that can be quickly set up at a temporary retail location. Ideally this would be used for settings such as a flea market where transportation of garments, merchandise, and display equipment needs to be done in a quick and efficient manner. Additionally, the flat panels of the garment rack arms 3a-b and tray 1 can decorated with designs, advertisements, gems, or mirrors to attract potential customers as well as provide functionality for the mobile retail location. In an alternative embodiment, the boards 9a-b and 10a-b can be fitted with attachments for securing additional shelving for display of merchandise or storage of retail equipment.

I claim:

1. An apparatus for hanging merchandise comprising:
   a rectangular tray having two short parallel sides and two long parallel sides;
   two collapsible arms, each further comprising a base board, a top board, and an extension board, wherein each extension board is slidably received into an extension channel formed in a top portion of each respective top board providing an adjustable height;
   a flat planar board attached to the two collapsible arms by a set of swing brackets at each end;
   a hanger pole removably coupled between the extension boards; and
   a plurality of casters, and wherein a first collapsible arm is hingedly attached to said rectangular tray along a first short parallel side and a second collapsible arm is hingedly attached to said rectangular tray along a second short parallel side being opposite to the first short parallel side, each collapsible arm being collapsible toward a center of the rectangular tray for storage.

2. The apparatus of claim 1 wherein the base boards are hingedly attached to a short side of the rectangular tray.

3. The apparatus of claim 1 wherein the top board is hingedly attached to the base board.

4. The apparatus of claim 1 wherein the flat planar board is attached to the two collapsible arms such that the board automatically swings into an elevated position when the two arms are erected parallel to one another.

5. The apparatus of claim 1 wherein the top board further comprises a track along its length.

6. The apparatus of claim 1 further comprising a means for hingedly attaching the base boards to the top boards.

7. The apparatus of claim 1 further comprising a compartment for storing parts.

8. The apparatus of claim 1 wherein at least the collapsible arms or tray are decorated with at least one of: color pattern, advertising, graphics, logo, mirrors, and jewels.

9. A garment transport system comprising:
a collapsible garment rack having at least a first and second configuration;
a garment transport bag adapted to be attached to the top of the garment transport rack while it is in a first configuration,
wherein the collapsible garment rack further includes a rectangular tray having two short parallel sides and two long parallel sides, and two collapsible arms, each arm further comprising a base board, a top board, and an extension board, wherein each extension board is slidably received into an extension channel formed in a top portion of each respective top board providing an adjustable height while in the second configuration, and
wherein a first collapsible arm is hingedly attached to the rectangular tray along a first short parallel side and a second collapsible arm is hingedly attached to the rectangular tray along a second short parallel side being opposite to the first short parallel side, each collapsible arm being collapsed toward a center of the rectangular tray in the first configuration.

10. The garment transport system of claim 9 wherein the first configuration of the garment rack is a collapsed configuration and the second configuration is an erected configuration.

11. The garment transport system of claim 10 wherein the collapsible garment rack is adapted to easily transition between the first and second configurations at least by erecting a set of collapsible arms.

12. The garment transport system of claim 11 wherein the transition between the first and second configurations further comprises engaging means for securing the erected arms and supporting a pole between the erected arms.

13. The apparatus of claim 1 further comprising a cover board having a plurality of latches, and wherein said rectangular tray includes a plurality of corresponding latches for engaging the plurality of latches of said cover board for storage.

14. The garment transport system of claim 9 wherein said collapsible garment rack further includes a cover board having a plurality of latches, and wherein said rectangular tray includes a plurality of corresponding latches for engaging the plurality of latches of said cover board while in the first configuration.

* * * * *